United States Patent [19]
Momiyama et al.

[11] 3,933,706
[45] Jan. 20, 1976

[54] NONFLAMMABLE BINDER COMPOSITION

[75] Inventors: Iwao Momiyama; Tatsuo Fukushima, both of Hiratsuka, Japan

[73] Assignee: Kansai Paint Company, Ltd., Japan

[22] Filed: Oct. 8, 1974

[21] Appl. No.: 513,044

[30] Foreign Application Priority Data
Oct. 12, 1973  Japan............................ 48-114532
Oct. 24, 1973  Japan............................ 48-118938

[52] U.S. Cl........ 260/22 S; 260/23 P; 260/29.2 EP; 260/29.6 MN; 260/29.6 MM; 260/29.7 N; 260/29.7 M; 260/DIG. 24; 260/80.75
[51] Int. Cl.².... C09D 1/04; C09D 3/76; C09D 5/18
[58] Field of Search........... 260/29.6 H, 29.6 MN, 260/29.6 MM, 22 S, 29.7 M, 29.7 N, 260/DIG. 24, 23 P, 29.2 EP

[56] References Cited
UNITED STATES PATENTS

| | | | |
|---|---|---|---|
| 2,676,159 | 4/1954 | Armitage............................ | 260/22 S |
| 3,453,127 | 7/1969 | Marotta et al...................... | 260/22 S |
| 3,574,651 | 4/1971 | Nitzshe et al..................... | 260/29.6 H |
| 3,629,169 | 12/1971 | Bedighian........................... | 260/22 S |
| 3,652,472 | 3/1972 | Clarke et al....................... | 260/22 CB |
| 3,839,256 | 10/1974 | Parkinson......................... | 260/29.6 H |

*Primary Examiner*—Ronald W. Griffin
*Attorney, Agent, or Firm*—Ostrolenk, Faber, Gerb & Soffen

[57]  ABSTRACT

A nonflammable binder composition having good properties, such as excellent adhesiveness, flexibility, storage stability and nonflammability, comprises a water-soluble silicate and a vinyl polymer emulsion which is prepared by emulsion polymerization of polymerizable vinyl monomer using, as an emulsifying agent, a neutralization product of water-soluble resin containing carboxyl groups.

9 Claims, No Drawings

NONFLAMMABLE BINDER COMPOSITION

BACKGROUND OF THE INVENTION

1. Field of the Invention

This invention relates to a nonflammable binder composition which comprises a special vinyl polymer emulsion and water-soluble silicate. More particularly, the invention relates to the nonflammable binder composition having excellent properties such as good adhesiveness, flexibility, storage stability and nonflammability. Furthermore, the invention relates to the nonflammable binder composition in which several advantageous properties of the vinyl polymer emulsion and water-soluble silicate are combined. The term "nonflammable composition" as used hereinafter means a composition which is hardly combustible, flame-resisting or non-combustible.

2. Description of Prior Art

In the prior art, water-dispersed vinyl polymer emulsion have been commonly employed for a wide variety of uses since they scarcely contain organic solvents and easily form coating films, and further the adhesiveness and flexibility of the coating films formed therefrom are good. Said vinyl polymer emulsions, however, mainly comprises organic components and are liable to be burnt in a fire, so that they cannot comply with the requirement of nonflammability for the construction of high-storied buildings. Further, as the formed coating film is relatively soft, it is not competent for a use in which the wear resistance is required. Accordingly, it is necessary from the industrial and commercial demands to improve the vinyl polymer emulsion by eliminating the above-mentioned disadvantages.

An inorganic binder of water-soluble silicate is also used in a coating material, adhesive agent, building material, molding material and so forth as the material to cover the defects of said organic binder. Said water-soluble silicate is employed for such uses because it has several desirable properties such as strong adhesiveness, binding property, good chemical resistance, non-flammability and high hardness, which are characteristic of the inorganic material. Although the water-soluble silicate has these advantages, it is not widely used since it has no flexibility just like the above-mentioned vinyl polymer emulsion.

Accordingly, it is industrially quite worthwhile to propose a binder having the advantageous features of both vinyl polymer emulsion and water-soluble silicate, and in view of the fact that the binder is aqueous and scarcely contains organic solvent, it is desirable from the standpoint of the prevention of environmental pollution. As a method for eliminating the brittleness of water-soluble silicate while keeping the advantageous characteristics, an organic polymer having excellent flexibility is generally mixed with the silicate. However, although the water-soluble silicate itself is stable, when a foreign material such as organic material is mixed therewith, agglomeration of siliceous material is caused to occur by neutralization of electric charges or change of pH value, or the organic material is possibly hydrolyzed during long term storage, so that it cannot be kept stable. Accordingly, it has been substantially difficult to improve the properties of water-soluble silicate by using organic polymers.

BRIEF SUMMARY OF THE INVENTION

Taking the above-mentioned characteristic of the water-soluble silicate into consideration, the inventors of the present application have made an extensive study on a combined system of water-soluble or water-dispersible organic polymer and water-soluble silicate so as to obtain a flexible, stable and nonflammable binder composition. As the result of such study, the binder composition of the present invention has been made, in which a special vinyl polymer emulsion was prepared by polymerizing a polymerizable vinyl monomer using a neutralization product of water-soluble resin containing carboxyl groups (hereinafter reffered to as "neutralized water-soluble resin") as the emulsifying agent.

Accordingly, the principal object of the present invention is to propose a novel and improved binder composition. A further object of the present invention is to propose a nonflammable binder composition which has the good properties of adhesiveness, flexibility and storage stability. A still further object of the present invention is to propose a nonflammable binder composition which having the advantageous features of both vinyl polymer emulsion and water-soluble silicate.

In accordance with the present invention, the nonflammable binder composition is prepared by mixing:

A. water-soluble silicate which is represented by the general formula:

$$M_2O \cdot xSiO_2$$

wherein M is an alkali metal or a nitrogen-containing basic group such as $N(CH_2OH)_4$, $N(C_2H_4OH)_4$, $N(C_2H_4OH)_3$ or $C(NH_3)_2NH$, and $x$ is a positive number not less than 0.5, and B. vinyl polymer emulsion which is obtained by emulsion polymerization of polymerizable vinyl monomer using, as an emulsifying agent, a neutralized water-soluble resin. In the preparation of said nonflammable binder composition, the above-mentioned water-soluble silicate and vinyl polymer emulsion which is produced by emulsion polymerization of polymerizable vinyl monomer using radical polymerization initiator are simply mixed together.

DETAILED DESCRIPTION OF THE INVENTION

When the water-soluble silicate is mixed with the polymer emulsion prepared using the conventional emulsifying agents such as lower molecular surface active agent, polyvinyl alcohol or hydroxyethyl cellulose, the emulsion is destroyed by the alkaline component in said water-soluble silicate, or the siliceous material is agglomerated in a short period by the neutralization of electric charges, so that a stable binder can not be prepared. Further, when the common water-soluble organic polymer such as acrylic acid copolymer or polyamide resin is added to the aqueous solution of water-soluble silicate, separation of resin phase is caused by the salting out effect of the silicate, so that no desirable binder can be prepared.

In the vinyl polymer emulsion of the present invention, the above-mentioned defects are eliminated, and the vinyl polymer emulsion of the invention can stably exist in the aqueous solution of water-soluble silicate. The reason why the nonflammable binder composition of the present invention can be prepared may be such that the neutralization of electric charges of siliceous material in the mixing step is moderated since the neutralized water-soluble resin protects the circumferences of emulsion particles and the alkaline neutralizing agent used dissociates in the solution which acts as the common ion with the silicate, and that the neutralized water-soluble resin is not salted out by the silicate since it sticks fast around the emulsion particles as a protective colloid and it is not dissolved but dispersed. Further, the binder composition of the present invention comprising the water-soluble silicate and vinyl polymer emulsion prepared by using such neutralized water-soluble resin as the emulsifying agent has a film forming property and can be used as an excellent binder, and as understood from the microscopic observation, the above depends upon the fact that the vinyl polymer emulsion particles come closer together to obtain a continuous polymer film when water contained in the emulsion is evaporated, while the water-soluble silicate also coagulates to form a separate phase from said emulsion, so that the emulsion and silicate form a three-dimensional network structure by hardening. The binder of the present invention having the above-mentioned structure becomes nonflammable and very hard without loss of the merits of respective components because the organic material is enveloped in the inorganic material mainly consisting of the silicate, and tightly interconnected together.

The water-soluble silicates as used in the present invention are represented by the general formula:

$$M_2O \cdot xSiO_2$$

in which M is an alkali metal or a nitrogen-containing basic group such as $N(CH_3OH)_4$, $N(C_2H_4OH)_4$, $N(C_2H_4OH))_3$ or $C(NH_3)_2NH$, and $x$ is a positive number not less than 0.5, and for example, there are alkali metal silicate consisting of silicic acid and alkali metal belonging to the group 1A of the periodic table, tertiary or quaternary ammonium silicate consisting of silicic acid and tertiary or quaternary amine, guanidine silicate consisting of silicic acid and guanidine, and colloidal silica. More particularly, sodium silicate, potassium silicate and lithium silicate as alkali metal silicates, triethanol ammonium silicate as tertiary ammonium silicate, and tetramethanol ammonium silicate and tetraethanol ammonium silicate as quanternary ammonium silicates are exemplified. These water-soluble silicates may be used alone or as a mixture of two or more of them. In the above-mentioned general formula, when the value of $x$ is less than 0.5, the water resistance of binder becomes poor because the alkali content exists in excess, which is not desirable for the practical uses.

The water-soluble resins having carboxyl groups used as emulsifying agents for the preparation of the vinyl polymer emulsion of the present invention are alkyd resin, epoxy ester resin, acid adducts of drying oils or semi-drying oils, phenol resin, amino resin, acrylic resin, polyamide resin and maleinized polybutadiene.

The above-mentioned acid adducts of drying oils or semi-drying oils include the reaction products which are prepared by adding fumaric acid, maleic acid, acrylic acid, methacrylic acid and itaconic acid to vegetable oils such as tung oil, perilla oil, dehydrated castor oil, linseed oil, soybean oil, cotton seed oil, sesame oil and rape seed oil or their fatty acids. The alkyd resin used in the present invention is a drying or semi-drying alkyd resin which is prepared by the conventional method, and as the polyhydric alcohols, ethylene glycol, propylene glycol, diethylene glycol, butylene glycol, 2,2-dimethylpropanediol, glycerol, trimethylolethane, trimethylolpropane, 1,2,6-hexanetriol, pentaerythritol, sorbitol, diglycerol and dipentaerythritol can be used, while as the polybasic ingredients, phthalic anhydride, isophthalic acid, trimellitic acid, tetrahydrophthalic anhydride, maleic anhydride, fumaric acid, tetrachloromaleic anhydride, hexachloroendomethylene tetrahydrophthalic acid, succinic acid, adipic acid and sebacic acid can be used, further as the oil components for modification, any drying oils and semi-drying oils can be used. For example, castor oil, dehydrated castor oil, tung oil, safflower oil, soybean oil, linseed oil, coconut oil, cotton seed oil, tall oil, olive oil, rice bran oil and other oils containing conjugated or non-conjugated unsaturated fatty acids can be used. Furthermore, epoxy ester resin which is prepared by modifying drying oil or semi-drying oil resin, or alkyd resin with epoxy resin can also be used. Still further, acrylic resins which are prepared by copolymerization of acrylic acid, methacrylic acid, alcohol esters of acrylic acid or methacrylic acid, and vinyl monomers such as styrene, vinyl toluene, acrylamide and acrylonitrile; and polyamide resin having carboxyl group can be used. As the neutralizing agents for the above-mentioned resins, inorganic alkalis such as lithiun hydroxide, potassium hydroxide and sodium hydroxide; ammonia; water-soluble amines such as monomethylamine, dimethylamine, trimethylamine, monoethylamine, diethylamine, triethylamine, mono-n-propylamine and dimethyl-n-propylamine; and hydroxyamines such as monoethanolamine, diethanolamine, triethanolamine, N-methylethanolamine, N-aminoethylethanolamine, N-methyldiethanolamine, monoisopropanolamine, diisopropanolamine, triisopropanolamine and hydroxylamine are used according to the conventional neutralization method. The degree of neutralization may be partial or complete neutralization of the carboxylic acid. The thus obtained water-soluble resin can be used alone or in admixture with one another.

The above-mentioned maleinized polybutadiene is produced by maleinizing polybutadiene with maleic acid and/or the anhydride thereof. When maleic anhydride is used, the ring-opening is carried out by using water, alcohol, amine or the like to form dicarboxylic, half-esterified or half-amide product, then the thus formed carboxyl groups are neutralized and used for the emulsion polymerization. Furthermore, the maleinized polymer may be hydroxylated or epoxidized and used thereafter for the emulsion polymerization.

The acid value of the above-mentioned water-soluble resins having carboxyl groups used in the present invention should be about 20 to 350, preferably about 40 to 200. When this acid value is less than 20, the effect as the emulsifying agent cannot be expected, and accordingly no desirable polymer emulsion can be prepared. If the acid value is more than 350, the stability of the silicate will be lost when the polymer emulsion is finally mixed with the water-soluble silicate. The neutralizing agents for the neutralization of carboxyl groups may be ammonia, amines, or hydroxides, oxides, carbonates or bicarbonates of alkali metals.

The neutralized water-soluble resin is used in such an amount that theoretical acid value relative to the total solids contained in the resultant vinyl polymer emulsion will be in the range of 5 to 150. Theoretical acid value relative to the total solid is determined by the following equation;

$$\begin{bmatrix} \text{Theoretical acid value} \\ \text{relative to the total} \\ \text{solid} \end{bmatrix} = A \times \frac{C}{B}$$

wherein A is the acid value of water-soluble resin containing carboxylic group, B is the total weight in grams of the water-soluble resin and vinyl monomers charged to the polymerization system and C is the weight in grams of water-soluble resin charged to the polymerization system. If the theoretical acid value is less than 5, the emulsion polymerization cannot sufficiently proceed and a desirable emulsion is not formed. If the theoretical acid value becomes more than 150, the stability of the silicate will be lost when the polymerization product is finally mixed with the water-soluble silicate.

The vinyl polymer emulsion of the present invention is the emulsion polymerization product obtained from polymerizable vinyl monomers having a Q value of at least 0.1 determined by Q-e scheme. Said Q-e scheme is a theory representing the addition reaction rate constant of monomers to radicals, which was firstly proposed by T. Alfrey Jr. and C. C. Price in 1947 (J. Polymer Sci., 2, 101). Said Q value is a constant showing the general reactivity of a monomer in Q-e scheme, and when the radical reactivity of a monomer is high, the value of Q generally becomes large.

As the polymerizable vinyl monomers having a Q value of at least 0.1 on Q-e scheme which are used in the present invention, there are for example, acrylic ester or methacrylic ester as represented by the general formula of

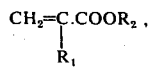

in which $R_1$ is a hydrogen atom or a methyl group and $R_2$ is an alkyl group having 1 to 18 carbon atoms. Examples of the vinyl monomers are alkyl esters of acrylic or methacrylic acid, glycidyl methacrylate, glycidyl acrylate, methoxybutyl acrylate, methoxybutyl methacrylate, methoxyethyl acrylate, methoxyethyl methacrylate, ethoxybutyl acrylate, ethoxybutyl methacrylate, allyl acrylate, allyl methacrylate, hydroxypropyl methacrylate, diethylaminoethyl methacrylate, allyloxyethyl methacrylate, styrene, α-methyl styrene, vinyltoluene, vinylpyridine, butadiene, isoprene, chloroprene, acrylonitrile and methacrylonitrile. These polymerizable vinyl monomers can be used alone or as a mixture of two or more of them, and they can be used together with about 10% by weight or less of water-soluble vinyl monomers such as acrylic acid, methacrylic acid, itaconic acid, acrylamide, methacrylamide, dimethylaminoethyl methacrylate, N-methylolacrylamide, N-methylolmethacrylamide, 2-hydroxyethyl methacrylate, 2-hydroxypropyl acrylate and acrolein.

In the emulsion polymerization, when a polymerizable vinyl monomer having a Q value of less than 0.1 in said Q-e scheme, such as vinyl acetate, and the emulsifying agent of the present invention are used, the monomer reacts with the emulsifying agent since the activity of radicals produced from said monomer is too large and the polymerization reaction of the vinyl monomers is impeded. With regard to the emulsion polymerization of the polymerizable vinyl monomer in the present invention, the conventionally known operation conditions can be well applied without any changes, and it may be carried out without the use of catalyst or in the presence of common radical polymerization initiator, or by applying radiant rays such as gamma rays.

As the above-mentioned polymerization initiators or polymerization initiating sources, for example, ionizing radiation, organic or inorganic peroxides, sulfides, sulfines, sulfinic acids, sulfones, azo compounds, diazo compounds, persulfates, perchlorates, water-soluble or oil-soluble redox polymerization initiators and the like can be effectively used.

The nonflammable binder composition is, as disclosed in the foregoing, prepared only by mixing the water-soluble silicate and the vinyl polymer emulsion made by using said emulsifying agent of neutralized water-soluble resin. it is, however, mixed using the conventional dispersing machines such as ball mills and colloid mills so as to obtain a more homogeneous product. Further, the water-soluble silicate can be mixed during the polymerization of emulsion, however, the stability of the final product is better when the silicate is added after the emulsion polymerization. The water-soluble silicate can be added as an aqueous solution or powder, and any difference of the qualities is not observed in the manner of additions to prepare the nonflammable binder compositions of the present invention.

The compounding ratio as solid of the water-soluble silicate and the vinyl polymer emulsion is in the range by weight of 80:20 to 30:70. When the ratio of vinyl polymer emulsion becomes less than 5% by weight, the flexibility of binder becomes insufficient, and when the ratio of vinyl polymer emulsion becomes more than 90% by weight, the nonflammability and hardness are reduced so that the desired nonflammable binder composition of the present invention can not be prepared.

The binder composition of the present invention is not only nonflammable but also flexible and has good adhesive and bonding properties, and excellent film forming property. Accordingly, the binder composition of the present invention can be used not only as the coating material as shown in the following Examples but also for the preparations of adhesive agents, ink vehicles and the like.

In order that those skilled in the art may better understand the present invention and the manner in which it may be practiced, the following specific Examples are given, wherein the parts and percent are parts by weight and percent by weight unless otherwise expressed.

EXAMPLE 1

A reaction vessel was fed with 78.3 parts of refined linseed oil and 13.0 parts of maleic anhydride, which were caused to react at 180°C for 5 hours with stirring in the presence of nitrogen gas to obtain maleinized linseed oil. 40 parts of butyl cellosolve was added to 100 parts of said maleinized linseed oil, and caused to react at 120°C for 2 hours; thus a half-estrified resin of 61 in acid value was obtained. To 70 parts of this reaction product were added 6 parts of 30% aqueous ammonia and 94 parts of water at room temperature; thus an aqueous solution of maleinized linseed oil containing 35.3% solids was prepared. A mixture of 15 parts of styrene and 30 parts of ethyl acrylate containing 0.3 part of benzoyl peroxide were added dropwise for 2 hours to 150 parts of the above aqueous solution which was being stirred at 80°C, and the mixture was caused to react at the same temperature (80°C) for a further 6 hours; thus a milky water dispersion of polymer containing 46% solids was obtained, in which the viscosity of said dispersion was V - W (Gardner, 20°C). The theoretical acid value of the product was about 30 on the assumption that vinyl monomers were completely polymerized. Then 130 parts of this polymer dispersion and 100 parts of 40% sodium silicate ($Na_2O.2SiO_2$) solution were mixed together to prepare a binder composition. By using a spray gun, the above binder composition was applied to the surfaces of 5 mm thick slate, 0.8 mm thick iron plate, an aluminum sash and 2 mm thick glass plate to form coating films of 30 microns in thickness. In the application to said slate, it was preheated in a drying oven at 180°C, and when the surface temperature became 80°C, the slate was subjected to the spraying. The test pieces were then prepared by baking the above coated plates at 150°C for 30 minutes.

The test results of thus formed test pieces are shown in the following Table 1 attached in the last part of this disclosure.

EXAMPLE 2

A maleinized linseed oil having an acid value of 223 was prepared by the reaction of 80 parts of refined linseed oil and 20 parts of maleic anhydride. Then, 40 parts of butyl cellosolve were added to 100 parts of said reaction product, and 17 parts of triethylamine and 752 parts of water were further added to obtain an aqueous solution containing 11% solids. After dispersing 11 parts of acrylonitrile which contained 0.1 part of $\alpha, \alpha'$-azobisisobutyronitrile into 100 parts of the above solution, the air in the reaction vessel was displaced with nitrogen gas and kept at 85°C with stirring, and a mixture of 32 parts of ethyl acrylate containing 0.2 part of benzoyl peroxide, 16 parts of acrylonitrile and 30 parts of styrene was dropped for 2 hours and further caused to react at 85°C for 10 hours. As the result of the above reaction, an aqueous dispersion of vinyl polymer containing 50 % solids and having a viscosity of X (Gardner, 20°C) was obtained. The stability of this reaction product was good. The theoretical acid value of the product was about 30 on the assumption that vinyl monomers were completely polymerized. Thereafter, 120 parts of this polymer dispersion, 75 parts of 20% lithium silicate ($Li_2O.8SiO_2$) and 75 parts of 20% colloidal silica (trademark: Snowtex C, made by Nissan Chemical Industries Co., Ltd. in Japan) were well mixed for 24 hours in a ball mill; thus the binder composition of the present invention was prepared. Further, in like manner as the foregoing Example 1, the above binder composition was applied to the surfaces of several plates and dried for 3 days at room temperature to obtain test pieces.

EXAMPLE 3

A 1 liter four neck flask was fed with 0.5 mol of maleic anhydride, 0.83 mol of phthalic anhydride, 0.5 mol of adipic acid, 0.05 mol of coconut oil fatty acid, 0.5 mol of triethylene glycol and 1 mol of diethylene glycol, and the mixture was subjected to condensation by heating at 190° C for 8 hours; thereby unsaturated polyester resin having an acid value of 75 was obtained. Then, 9 parts of triethylamine, 24 parts of water and 10 parts of ethylene glycol monoethyl ether were mixed to 100 parts of said polyester resin and stirred at 70°C for 1 hour to obtain a water-soluble unsaturated polyester resin varnish containing 70% of non-volatile matter. The non-volatile matter in the varnish was adjusted to 40% by adding 45 parts of water and 30 parts of butyl cellosolve to 100 parts of said varnish. After the adjustment, 5 parts of acrylonitrile containing 0.1 part of benzoyl peroxide was dispersed in 100 parts of the adjusted solution, and while stirring at 80°C, a mixture of 3 parts of n-butyl acrylate containing 0.2 part of benzoyl peroxide, 5 parts of 2-ethylhexyl acrylate, 6.5 parts of styrene and 0.5 part of acrylic acid was dropped for 2 hours, and thereafter the reaction mixture was further caused to react for 6 hours at 80°C. Through the above reaction, a milky aqueous dispersion of polymer having a solid content of 50% and a viscosity of Y (Gardner, 20°C) was obtained. The theoretical acid value of the product was about 56.5 on the assumption that vinyl monomers were completely polymerized. Thereafter, 160 parts of the polymer dispersion, 125 parts of 20% tetraethanol ammonium silicate ($x = 4.5$), 62.5 parts of 40% potassium silicate ($x = 3.0$), 30 parts of zinc white and 30 parts of titanium dioxide were well mixed in a ball mill for 3 hours to prepare the binder composition of the present invention. Further, in like manner as the foregoing Example 1, this binder composition was applied to the surfaces of several plates and baked for 10 minutes at 200°C to obtain test pieces.

EXAMPLE 4

A monomer mixture (100 parts) of the following composition which containing 0.5 part of $\alpha, \alpha'$-azobisiso-butyronitrile was dropped for 2 hours into 60 parts of butyl cellosolve which was stirred at 85°C.

| Monomer Mixture: | |
| --- | --- |
| Styrene | 25 parts |
| Ethyl acrylate | 30 parts |
| 2-Ethylhexyl acrylate | 10 parts |
| Hydroxyethyl methacrylate | 10 parts |
| Acrylic acid | 25 parts |

After the above dropping, the polymerization was continued for a further 4 hours to obtain a viscous polymerization product containing 62.5% of non-volatile matter. The resin acid value of this reaction product was 192. Then, 40 parts of triethylamine and 300 parts of water were added to 160 parts of said polymerization product to obtain a water-soluble resin solution containing 20% non-volatile matter. Further, the following monomer mixture containing 0.4 part of $\alpha, \alpha'$-azobisiso-butyronitrile was added dropwise for 2 hours with stirring to 100 parts of the above water-soluble resin solution which was being kept at 85 C.

| Monomer Mixture: | |
| --- | --- |
| Ethyl acrylate | 20 parts |
| Hydroxyethyl methacrylate | 10 parts |
| Acrylonitrile | 10 parts |
| Styrene | 20 parts |

After the above dropping, the polymerization was continued for a further 5 hours. The theoretical acid value of the product was about 75 on the assumption that vinyl monomers were completely polymerized. Then, 320 parts of water and 150 parts of sodium silicate ($x = 3$) powder were added to the above product to prepare a binder composition. Further, 3 parts of ammonium metaphosphate, 1 part of zinc borate and 10 parts of red iron oxide were dispersed in 100 parts of said binder composition by using a ball mill for 1 hour, and thereafter the thus obtained mixture was applied to the surfaces of several substrates and baked for 30 minutes at 80°C to prepare test pieces.

EXAMPLE 5

The following monomer mixture (100 parts) which contained 0.5 part of α, α'-azobisisobutyronitrile was dropped for 2 hours to 60 parts of butyl cellosolve which was heated at 85°C with stirring.

| Monomer mixture: | |
|---|---|
| Styrene | 20 parts |
| Ethyl acrylate | 55 parts |
| 2-Ethylhexyl acrylate | 10 parts |
| Hydroxyethyl methacrylate | 10 parts |
| Acrylic acid | 5 parts |

After the above dropping, the polymerization was continued for a further 4 hours to obtain a viscous polymerization product containing 62.5% non-volatile matter, the acid value of which was 39. Then, 100 parts of the above polymerization product was mixed with 3 parts of triethylamine and 105 parts of water; thus a water-soluble resin solution containing 30% non-volatile matter was prepared. Further, 30 parts of the following monomer mixture containing 0.2 part of benzoyl peroxide was dropped for 2 hours to 100 parts of said resin solution which was heated at 85°C with stirring.

| Monomer Mixture: | |
|---|---|
| Ethyl acrylate | 80 parts |
| Hydroxyethyl methacrylate | 20 parts |
| Styrene | 10 parts |

After the above dropping, the polymerization was further continued for 5 hours to obtain a polymer dispersion containing 46% solids and having a viscosity of Y - Z (Gardner, 20°C). The theoretical acid value of the product was about 8 on the assumption that vinyl monomers are completely polymerized. A binder composition was then prepared by mixing 60 parts of this polymer dispersion, 50 parts of 20% triethanol ammonium silicate ($x = 6$), 50 parts of 20% collodial silica (trademark: Snowtex 20, made by Nissan Chemical Industries, Co., Ltd. in Japan) and 375 parts of 20% lithium silicate. In like manner as the foregoing Example 1, this binder composition was applied to the surfaces of several plates, which were then dried for 3 days at room temperature to prepare test pieces.

EXAMPLE 6

An autoclave was fed with 150 g of polybutadiene (number average molecular weight: 1,900, 1,4-cis type: 72%, 1,4-trans type: 27% and 1,2-vinyl type 1%), 20 g of maleic anhydride and 75 ml of xylene, and after displacing the air in the autoclave by nitrogen gas, the contents were caused to react by heating at 190° to 200°C for 5 hours with vigorous stirring. After the reaction, the reaction product was well rinsed with water, 60 ml of butyl cellosolve was added thereto, and the remaining water was removed by an evaporator to prepare a maleinized polybutadiene solution. The acid value of this maleinized polybutadiene was 93 and the concentration was 85.6%.

In the next step, an autoclave was fed with a solution consisting of 71.5 g of butyl methacrylate, 0.5 g of lead naphthenate (8% as metallic lead); and 40 g of the maleinized polybutadiene prepared in the above step, 10 ml of 28% aqueous ammonia, 100 ml of water and 200 mg of ammonium persulfate, and the air in the autoclave was replaced with nitrogen gas by repeating the procedures of nitrogen gas displacement and pressure reduction alternately for 30 minutes. Then, the mixture was heated at 75° to 85°C for 2 hours with stirring. Thereby, an emulsion containing 47.8% solids was prepared. The theoretical acid value of the product, assuming the butyl methacrylate was completely polymerized, was 30.0.

A binder composition was prepared by adding 65 parts of the above emulsion to 230 parts of 30% lithium silicate aqueous solution ($x = 3.5$) with vigorous stirring. In like manner as the foregoing Example 1, the thus prepared binder was applied to the surfaces of several plates and the coated plates were allowed to stand for 3 days in a room at 30°C to obtain test pieces.

EXAMPLE 7

A ball mill was fed with 170 parts of 30% sodium silicate ($x = 4.0$), 100 parts of 20% collodial silica and 60 parts of the emulsion as prepared in Example 6, and well mixed for 24 hours to prepare a binder composition. In like manner as the foregoing Example 1, this binder composition was applied to the surfaces of several plates and baked for 30 minutes at 150°C.

EXAMPLE 8

The following components were mixed and the mixture was applied to the surface of several plates in like manner as the foregoing Example 1, and then the coated plates were baked at 200°C for 15 minutes.

| Binder components: | |
|---|---|
| 20 % Tetraethanol ammonium silicate ($x = 4.5$) | 50 parts |
| 40 % potassium silicate ($x = 3.0$) | 100 parts |
| Zinc white | 15 parts |
| Titanium dioxide | 15 parts |
| Emulsion prepared in Example 6 | 100 parts |

EXAMPLE 9

A binder composition was prepared by mixing the following components and it was applied to the surfaces of several plates in like manner as the foregoing Example 1, and then the coated plates were baked at 250°C for 10 minutes.

| Binder components: | |
|---|---|
| Powder of sodium silicate ($x = 2$) | 30 parts |
| Aluminum metaphosphate | 5 parts |
| Zinc borate | 1 part |
| Red iron oxide | 20 parts |
| Emulsion prepared in Example 6 | 140 parts |
| Water | 100 parts |

EXAMPLE 10

A binder composition was prepared by mixing the following components and it was applied to the surfaces of several plates in like manner as the foregoing Example 1; then the coated plates were baked at 80°C for 30 minutes.

Binder components:
20 % Triethanol ammonium silicate (x = 6)          80 parts
20 % Colloidal silicate (trademark: Snowtex 20, made by Nissan Chemical Industries, Ltd., in Japan)                                                             80 parts
20 % Lithium silicate (x = 4)                      50 parts
Emulsion prepared in Example 6                    180 parts

EXAMPLE 11

An autoclave was fed with 300 g of polybutadiene (number average molecular weight: 1,100, 1,4-trans type: 10.8% and 1,2-vinyl type 89.2%), 180 g of maleic anhydride, 200 ml of xylene and 150 ml of methyl isobutylketone, and after displacing air in the autoclave by nitrogen gas, the contents were caused to react by heating at 185° to 195°C for 4.5 hours with vigorous stirring. After the reaction, the reaction product was rinsed well with water and then with methanol. 60 ml of butyl cellosolve was added thereto, and the remaining methanol was removed by an evaporator to prepare a maleinized polybutadiene solution. the acid value of this maleinized polybutadiene was 190 and the concentration was 83%.

In the next step, an autoclave was fed with 220 g of methyl methacrylate, 220 g of lauryl methacrylate, 200 g of the maleinized polybutadiene prepared in the above step, 66 ml of 28% aqueous ammonia, 737 ml of water and 300 mg of ammonium persulfate, and the air in the autoclave was replaced with nitrogen gas by repeating the procedure of nitrogen displacement and pressure reduction alternately for 30 minutes. Then, the mixture was heated at 70° to 80°C for 6 hours with stirring. Thereby, an emulsion containing 41.0% solids was prepared. The theoretical acid value of the product assuming the butyl methacrylate to be completely polymerized was 52.0

Further, a binder composition was prepared by adding 60 parts of the above emulsion to 300 parts of 30% potassium silicate aqueous solution ($x = 3.5$) with vigorous stirring. In like manner as the foregoing Example 1, the thus prepared binder was applied to the surfaces of several plates and the coated plates were allowed to stand for 3 days in a room at 30°C to obtain test pieces.

COMPARATIVE EXAMPLE 1

A mixture of 5 parts of polyvinyl alcohol having polymerization degree of 1,000, 50 parts of water, 0.3 part of potassium persulfate and 45 parts of vinyl acetate, was stirred for 5 hours at 80°C in the presence of nitrogen gas; thereby a viscous emulsion having a viscosity of Z(Gardner, 20°C) was prepared. This emulsion was applied to the surfaces of several plates in like manner as the foregoing Example 1, and the coated plates were dried for 3 days at room temperature to obtain test pieces.

COMPARATIVE EXAMPLE 2

An aqueous solution of 20% sodium silicate ($x = 2$) was applied to the surfaces of several plates in like manner as the foregoing Example 1, and the coated plates were baked for 30 minutes at 150°C to obtain test pieces.

COMPARATIVE EXAMPLE 3

The emulsion as prepared in said Comparative Example 1 and 50% sodium silicate solution ($x = 2$) were mixed together. In the initial state of the mixing, the mixture was fluid, however, gelation occurred after about 20 minutes.

COMPARATIVE TESTS

The properties of binders in the foregoing Examples 1 to 11 and Comparative Examples 1 to 3 were subjected to various tests, the results of which are shown in the following Table 1. In all tests except the bending test, no difference between each substrate as coated was observed, so that the results on the slates are shown in the table, while the bending test was carried out with respect to iron plates.

The test methods were as follows

1. Storage Test

A sample was put into a closed bottle and stored for 3 months at 20°C, and thereafter the condition of the sample was observed.

2. Bending Test

The test piece (iron plate) was bent with 5 mm in radius of curvature, and the condition of coating was observed.

3. Adhesion Test

One hundred squares having 1 mm sides were made on the coated surface by parallel and crossed knife-cut lines, then a pressure-sensitive tape (Scotch tape) was attached to the cut squares and the tape was peeled off. The remaining squares on the plate were counted.

4. Firing Test

The coated plate was heated by a Bunsen burner for 3 minutes, and the condition of coating after the heating was observed.

5. Hardness

The coated surface was subjected to scratching test by using various kinds (hardness) of pencils.

6. Water Resistance

The coated plate was immersed in flowing water at 20°C for 7 days, and after that, the condition of coating film was observed.

Table 1

| Tests | Storage Test | Bending Test | Adhesion Test | Firing Test (*2) | Hardness (*3) | Water Resistance |
|---|---|---|---|---|---|---|
| Ex. 1 | Good | Good | 100/100 | NF | 9H+ | Good |
| Ex. 2 | Good | Good | 100/100 | SE | 9H+ | Good |
| Ex. 3 | Good | Good | 100/100 | SE | 9H+ | Good |
| Ex. 4 | Good | Good | 100/100 | NF | 9H+ | Good |
| Ex. 5 | Good | Good | 100/100 | NF | 9H+ | Good |
| Ex. 6 | Good | Good | 100/100 | NF | 9H+ | Good |
| Ex. 7 | Good | Good | 100/100 | NF | 9H+ | Good |
| Ex. 8 | Good | Good | 100/100 | SE | 9H+ | Good |
| Ex. 9 | Good | Good | 100/100 | SE | 9H+ | Good |

Table 1-continued

| Tests | Storage Test | Bending Test | Adhesion Test | Firing Test (*2) | Hardness (*3) | Water Resistance |
|---|---|---|---|---|---|---|
| Ex.10 | Good | Good | 100/100 | NF | 9H+ | Good |
| Ex.11 | Good | Good | 100/100 | NF | 9H+ | Good |
| CEx.1 | Good | Good | 6/100 | CB | 2B | Blister |
| CEx.2 | Good | Crack | 100/100 | NF | 9H+ | Dissolved |
| CEx.3 (*1) | Gelation | — | — | — | — | — |

Notes:
*1) Ex. — Example; CEx. — Comparative Example
*2) SE — Self-extinguishable; NF — Nonflammable CB — Completely burnt
*3) 9H+ — Harder than 9H In accordance with the above examples and test results, it will be understood that the nonflammable binder composition of the present invention has excellent properties and is useful. It should be emphasized, however, that the specific examples shown herein are intended as merely illustrative and in no way restrictive of the invention.

What is claimed is:

1. A nonflammable binder composition which comprises (A) 30 to 80 weight percent of water-soluble silicate represented by the formula:

$$M_2O \cdot xSiO_2$$

wherein M is an alkali metal or a nitrogen-containing basic group selected from the group consisting of $N(CH_2OH)_4$, $N(C_2H_4OH)_4$, $N(C_2H_4OH)_3$ and $C(NH_3)_2NH$, and $x$ is a positive number not less than 0.5, and (B) 70 to 20 weight percent of vinyl polymer emulsion which is the emulsion polymerization product of polymerizable vinyl monomer using, as an emulsifying agent, a neutralized product of water-soluble resin containing carboxyl groups and having an acid value of 20–350 in an amount such that the theoretical acid value relative to the total solids contained in the resultant vinyl polymer emulsion is about 5–150.

2. A nonflammable binder composition as claimed in claim 1, in which said polymerizable vinyl monomer has a Q value of at least 0.1 as determined by the Q-e theory.

3. A nonflammable binder composition as claimed in claim 1, in which said water-soluble resin is selected from the group consisting of alkyd resin, epoxy ester resin, acid adduct of drying oil or semi-drying oil, acrylic resin, polyamide resin and maleinized polybutadiene.

4. A nonflammable binder composition as claimed in claim 1 in which said acid value is 40–200.

5. A nonflammable binder composition as claimed in claim 1 in which said emulsifying agent is maleinized linseed oil which has been neutralized with ammonia or triethylamine.

6. A nonflammable binder composition as claimed in claim 1 wherein said emulsifying agent is an alkyd resin of ingredients comprising maleic anhydride, phthalic anhydride, adipic acid, coconut oil fatty acid, triethylene glycol and diethylene glycol which has been neutralized with triethylamine and wherein said silicate is a mixture of potassium silicate and tetraethanol ammonium silicate.

7. A nonflammable binder composition as claimed in claim 1 in which said emulsifying agent is the reaction product of ingredients comprising styrene, ethylacrylate, 2-ethylhexylacrylate, hydroxyethylmethacrylate, and acrylic acid which has been neutralized with triethylamine and wherein said silicate is sodium silicate or a mixture of lithium silicate and triethanol ammonium silicate.

8. A nonflammable binder composition as claimed in claim 1 wherein said emulsifying agent is ammonia neutralized maleinized polybutadiene, said polymerizable vinyl monomer is butylmethacrylate and said silicate is selected from the group consisting of sodium silicate, lithium silicate, a mixture of potassium silicate and tetraethanol ammonium silicate, and a mixture of lithium silicate and tetraethanol ammonium silicate.

9. A nonflammable binder composition as claimed in claim 1 in which said polymerizable vinyl monomer is at least one acrylic or methacrylic ester of the formula

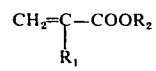

in which $R_1$ is hydrogen or methyl and $R_2$ is alkyl of 1–18 carbon atoms.

* * * * *